United States Patent [19]

Hähnke et al.

[11] Patent Number: 4,985,044

[45] Date of Patent: Jan. 15, 1991

[54] MULTI-COMPONENT MIXTURES OF BLUE DISPERSE AZO DYES FOR THE DYEING OF SYNTHETIC FIBERS

[75] Inventors: Manfred Hähnke, Kelkheim; Reinhard Kühn, Frankfurt am Main; Ulrich Bühler, Alzenau, all of Fed. Rep. of Germany

[73] Assignee: Hoechst Aktiengesellschaft, Frankfurt am Main, Fed. Rep. of Germany

[21] Appl. No.: 362,845

[22] Filed: Jun. 7, 1989

[30] Foreign Application Priority Data

Jun. 9, 1988 [DE] Fed. Rep. of Germany ....... 3819563

[51] Int. Cl.$^5$ .................. C09B 67/22; D06P 1/18; D06P 3/54
[52] U.S. Cl. ............................ 8/639; 8/532; 8/533; 8/638; 8/921; 8/922
[58] Field of Search .............................. 8/639

[56] References Cited

U.S. PATENT DOCUMENTS

| | | | |
|---|---|---|---|
| 4,381,262 | 4/1983 | Buhler et al. | 534/850 |
| 4,405,330 | 9/1983 | Bergmann et al. | 8/639 |
| 4,422,854 | 12/1983 | Hahnle et al. | 8/471 |
| 4,689,050 | 8/1987 | Hahnke et al. | 8/639 |
| 4,750,912 | 6/1988 | Kuhn | 8/639 |
| 4,851,012 | 7/1989 | Buhler et al. | 8/639 |

FOREIGN PATENT DOCUMENTS 866307 10/1978 Belgium.
3216788 11/1983 Fed. Rep. of Germany.

*Primary Examiner*—A. Lionel Clingman

[57] ABSTRACT

Since anthraquinonoid disperse dyes of the dark blue and navy region give only a low color strength on synthetic fibers, there was an urgent need for their coloristically advantageous substitution by high performance blue azo dyes which are suitable for being used in the carrier dyeing process.

According to the invention, the systematic development of multi-component mixtures based on selected blue azo dyes from the dicyano azo series makes it possible to avoid most of the disadvantages mentioned.

20 Claims, No Drawings

MULTI-COMPONENT MIXTURES OF BLUE DISPERSE AZO DYES FOR THE DYEING OF SYNTHETIC FIBERS

DESCRIPTION

Polyester (PES) fibers can be dyed by means of disperse dyes by exhaustion from an aqueous medium, using HT dyeing conditions at temperatures between 105° to 140° C. or using so-called carriers (dyeing accelerators) at temperatures between 95 and 160° C.

The conventional carrier dyeing process is carried out on an industrial scale usually at the boiling temperature of the exhaustion bath. However, for this type of dyeing of synthetic fibers at the boiling point of the aqueous liquor, only a few selected disperse dyes are suitable for achieving all possible depths of color. Despite the participation of a carrier, many disperse dyes only lead to colorations having low to medium depths of color.

With respect to the shades of the dark blue and navy range, in the dyeing of PES fibers under boiling temperature conditions, it is probably the anthraquinone derivatives C.I. Disperse Blue 35 and C.I. Disperse Blue 81 which have prevailed in practice as coloristically most important blue dyes for producing self-shade and combination shade dyeings. However, on the other hand, it is no longer a novelty that this type of anthraquinonoid blue dyes very generally gives only a relatively low color strength, which, as a rule, amounts to a high dye consumption and thus considerable production costs for the dyeings (in particular in the case where greater depths of color are produced).

Moreover, dark blue and navy dyeings on PES fibers which were produced by means of C.I. Disperse Blue 35 or C.I. Disperse Blue 81 show a strong shift in hue in the direction of the red end of the spectrum, when viewed under evening light (incandescent lamp), that is to say, the color perceived is completely variable, depending on the type of light source used.

Furthermore, the dyes C.I. Disperse Blue 35 and C.I. Disperse Blue 81 produce in the deep shades only unsatisfactory exhaustion of the dyebath compared to other conventional disperse dyes in the dyeing of PES fibers, so that the remaining, still colored residual dye liquors lead to undesirable pollution of the effluent.

A person skilled in the art also knows by now that deep, clear blue dyeings can be obtained by using mixtures of two or three blue disperse azo dyes to be selected specifically in the exhaust dyeing of PES fiber material by the carrier dyeing method.

Nonetheless, in the area of the dyeing of PES fibers and their mixtures with other fibers by the carrier dyeing process in dark blue and navy shades, there was still a high demand for improving the coloristic behavior and the dyeing results compared to the prior art.

As is known, blue disperse azo dyes of the following formulae I to VIII have already been proposed in the literature for this purpose:

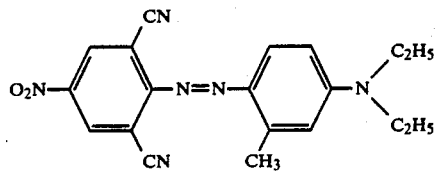

(I)

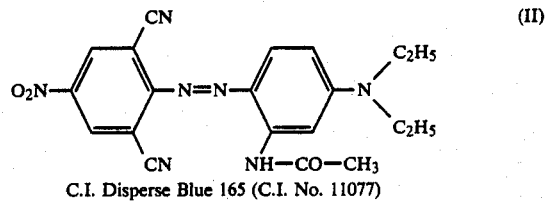

C.I. Disperse Blue 165 (C.I. No. 11077)

(II)

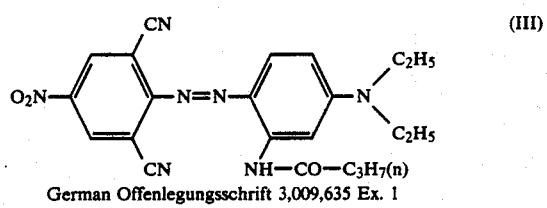

German Offenlegungsschrift 3,009,635 Ex. 1

(III)

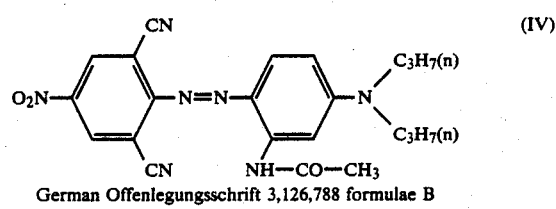

German Offenlegungsschrift 3,126,788 formulae B (IV)

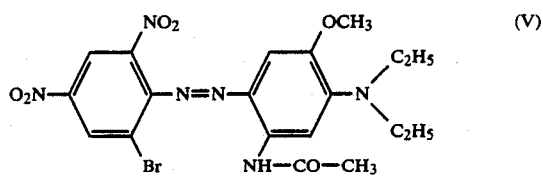

(V)

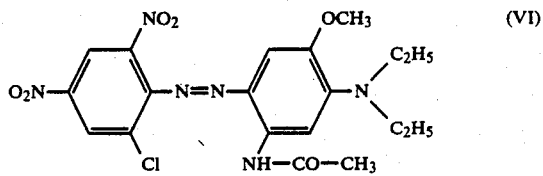

(VI)

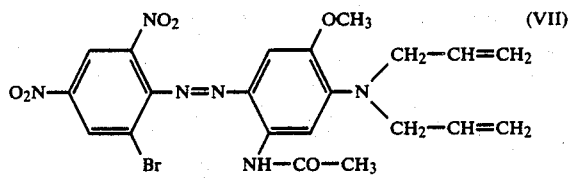

(VII)

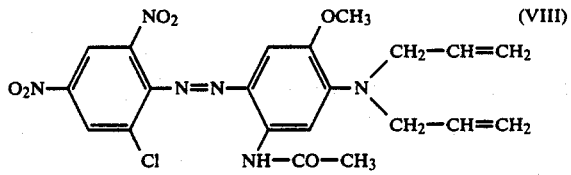

(VIII)

All these dyes which have the structure given by way of their formula show a characteristic behavior in the dyeing of PES fibers which restrict or even preclude their use for obtaining a neutral evening color by the carrier dyeing process:

| Dye of the formula | Coloristic behavior as individual dye |
|---|---|
| I: | Insufficient color build-up down to deep blue, dark blue, navy shades in combination with insufficient dyebath exhaustion. |

-continued

| Dye of the formula | Coloristic behavior as individual dye |
|---|---|
| | Strong shift in hue towards the red end of the visible spectrum in evening light. |
| II to VI: | Color build-up and dyebath exhaustion even poorer than in case I; this is particularly true for II. |
| | Shift in hue also towards the red end of the visible spectrum in evening light. |
| V to VIII: | Color build-up and dyebath exhaustion as in case III. |
| | Shift in hue towards the green end of the visible spectrum in evening light. |

In view of the facts described above with respect to the dyeing results obtainable and also the costs involved, the object of the present invention was to develop high-performance dye mixtures based on the dicyano azo series, which allow a coloristically advantageous substitution of anthraquinonoid disperse dyes of the dark blue and navy range, in particular of C.I. Disperse Blue 35 and C.I. Disperse Blue 81, primarily for the application in the carrier dyeing process, in which the decisive factors for the suitability of the substituted products should be favorable costs, availability, accessibility, at least equally good exhaustion properties and build-up, neutral evening color and low staining of adjacent fibers.

This object is achieved according to the invention in that the disadvantages mentioned of the blue individual dyes of the abovementioned type in the exhaustion dyeing of, in particular, PES fibers is avoidable by the selective use of a combination of the type of azo compounds described below. The reason is that as a result of experimental investigations it has surprisingly been found that mixtures of several of these individual dyes show a synergistic exhaustion behavior only if certain structural features are present, while mixtures of other dyes do not have any better exhaustion behavior than the corresponding individual dyes.

The present invention accordingly provides dye formulations in the form of multi-component mixtures or mixed crystals of blue disperse azo dyes, which are composed of the dyes of the formulae I and II and, if desired, of the formulae III and/or IV, and of the dyes of the formulae V and/or VI and/or VII and/or VIII or contain these dyes.

Preferred conditions apply according to this invention, if the dye formulations represent
  (a) a mixture or a mixed crystal of the dyes of the formulae I, II and III, and one of the dyes of the formulae V, VI, VII or VIII, or
  (b) a mixture or a mixed crystal of the dyes of the formulae I, II and IV, and one of the dyes of the formulae V, VI, VII or VIII.

A dye formulation which contains from 10 to 40, preferably 15 to 30, parts by weight of the dye of the formula I, and 5 to 30, preferably 10 to 20, parts by weight of the dye of the formula II, and 0 to 20, preferably 3 to 15, parts by weight of the dyes of the formulae III and/or IV, and 20 to 75, preferably 35 to 70, parts by weight of the dyes of the formulae V, VI, VII and/or VIII and in which the relative amounts of the underlying individual dyes are each calculated relative to a total weight of the formulation of 100 parts by weight of the dyes of the formulae I to VIII and (in the case of commercial products) are based on the content of the pure dye has proven to be particularly advantageous according to the invention.

Dye formulations which have the features according to the invention and are present as mixture or as mixed crystal in the form of a finely divided mixture (in the state ready for dyeing) obtained, for example, by milling by means of a dispersant(s) are highly suitable for the exhaustion dyeing of known synthetic fibers (for example composed of polyester of cellulose ester fiber materials) by themselves or as component of mixtures containing these synthetic fibers together with natural fibers (such as wool, cotton) or regenerated fibers (primarily regenerated cellulose) at the boiling temperature (95°–100° C.) of the aqueous dyeing medium or under high temperature conditions (105°–140° C.) in the presence or absence of a carrier customary in practice. According to the present invention, they are used as disperse blue dyes for achieving in particular blue standard shades on the synthetic fibers or the synthetic fiber component of fiber mixtures, or also of combination shades with concomitant use of further disperse blue dyes of a chemical structure different from that of the azo compounds of the formulae I to VIII, for example anthraquinonoid blue disperse dyes, if appropriate in the additional presence of disperse dyes mixed components of different structure which produce by themselves other shades than blue. A dyeing process of the type mentioned and the use of the novel dye formulations on the basis mentioned are at the same time also provided by the present invention.

The preparation of the formulations according to the invention from the disperse blue dyes of the formulae I to VIII can carried out by mixing ready-finished (finely water-dispersable) dye formulations of the underlying individual dyes; by conjoint finishing of the underlying individual dyes as a mixture, that is to say, by conjoint milling of the wet mixtures of the individual dyes in the presence of conventional nonionic or anionic dispersants (for example a lignosulfonate) in a conventional pearl mill, if appropriate under conditions under which the formation of mixed crystals from the underlying individual dyes can take place, possibly followed by spray-drying; or by finishing a mixed crystal of the individual dye components involved which is formed as a result of specific reaction conditions, for example by joint azo coupling or joint cyano exchange.

Using the dye formulations illustrated according to the invention by means of their structure, it is possible to dye synthetic fiber material, primarily hydrophobic polyester fibers based on polyethylene terephthalate, polybutylene terephthalate or polycyclohexylene terephthalate, and also fibers which are derived from mixed polymers of these PES with di- or triethylene glycol, isophthalic acid, or benzo-1,4-diphosphoric acid as the component incorporated. However, it is also possible to dye PES fibers which are modified in a different manner by means of the dye mixtures according to the invention. Furthermore, the PES fibers can be mixed with fiber material of natural origin such as wool, cotton, or with regenerated cellulose in mixing ratios of 10 to 90%, preferably 30 to 70% of PES fiber content for the dyeing according to the invention. Likewise, secondary cellulose acetate and cellulose triacetate are suitable as substrate to be dyed by the dye mixtures according to the invention.

The principle of the present invention is applicable to the dyeing of the abovementioned materials in various processing forms, for example as loose fiber, tops, yarn or piece goods.

The dyeing of synthetic fibers or their mixtures by means of the dye mixtures or dye mixed crystals according to the invention is carried out by the customary exhaustion dyeing process. In this context, the application of this technology for the exhaust dyeing under boiling temperature conditions, which is carried out in dyeing apparatuses which are open to the atmosphere (for example reel becks) with the participation of carriers which are customary in practice and are based on, for example, ophenylphenol, di- or trichlorobenzenes, methyl- or chloronaphthalenes, alkyl benzoates or cresotinates, diphenyl and the like and, if desired in the presence of customary dispersants and/or leveling agents, should be mentioned in particular. Furthermore, the dyeing can also be carried out by a conventional high temperature (HT) exhaustion method at temperatures between 105° and 140° C. The actual dyeing is advantageously followed by reduction clearing or an aftertreatment of the dyed material with the aid of dispersants for removing incompletely fixed dye components.

If mixtures of PES fibers with wool, cotton or regenerated cellulose fibers are used, the adjacent fiber component can be dyed by means of suitable dyes in the same or a different shade (melanges, weaving pattern) before or after the PES dyeing is carried out.

The dye mixtures and mixed crystals claimed can be used by themselves (i.e. in the blue region) for producing blue self-shade dyeings and also in combination with other commercial disperse dyes of different structure which also produce blue shades, or even in combination with those dyes which produce shades different from blue, for example yellow and red disperse dyes (trichromatic dyeing). However, a combination of this type requires that all dyes involved must have essentially the same exhaustion behavior under the dyeing conditions employed. The light fastness of these dyeings which can be obtained in the blue and the trichromatic range is good. These shading dyes can already be present from the beginning in the formulation of the dyes of the formulae I to VIII which is ready to use for dyeing or they are directly added to the liquor not until the dyeing is carried out.

The use of the dye mixtures or mixed crystals according to the invention gives clear deep dark blue or navy dyeings, depending on the mixing ratio of the individual components on the synthetic fiber material. The color depth is significantly higher than in the case where anthraquinonoid blue dyes and their mixtures with various azo dyes are used.

The dyebath exhaustion or—in other words—the residual dye content in the dyebath upon reaching equilibrium is much lower in the case where the dye mixtures or mixed crystals claimed are used than in the case where, for example, C.I. Disperse Blue 35 and C.I. Disperse Blue 81 are used.

A very particularly surprising characteristic feature of the dye mixtures and mixed crystals according to the invention is their improved dyebath utilization compared to the corresponding individual dyes and compared to mixtures consisting of only two each of the components described.

In addition, the use of the dye mixtures or mixed crystals according to the invention in the dyeing of fiber mixtures at the boiling temperature, when known carriers are employed, leads to a significantly reduced staining of wool, cotton or regenerated cellulose adjacent fiber components compared to C.I. Disperse Blue 35 and C.I. Disperse Blue 81. Moreover, the slight staining in the dyeings by means of the dye mixtures or mixed crystals according to the invention can be completely removed by a reductive aftertreatment which is customary in practice (for example with sodium dithionite/sodium hydroxide, sodium dithionite/ammonia).

The dark blue and navy dyeings obtainable by means of the dye mixtures claimed have an almost stable hue under artificial light compared to dyeings based on the anthraquinone dyes C.I. Disperse Blue 35 and C.I. Disperse Blue 81.

In the examples described below, parts and percentages are by weight, unless stated otherwise.

EXAMPLE 1

To demonstrate a dyeing according to the present invention, a finely divided dye dispersion is produced from a mixture of 25 parts of the disperse blue dye of the formula I, 15 parts of the disperse blue dye of the formula II, 10 parts of the disperse blue dye of the formula III, 50 parts of the disperse blue dye of the formula V and 400 parts of a conventional dispersant from the series of the lignosulfonates by aqueous milling in a pearl mill and this dispersion is subsequently dried by spray-drying.

The subsequent exhaustion dyeing is carried out by maintaining boiling temperature conditions and using as piece goods 100 parts of a polyester fiber of the polyethylene terephthalate type, which are introduced into a dye bomb containing a bath of 1000 parts of water of 60° C., 2 parts of crystalline sodium acetate, 3 parts of 30% strength acetic acid, 5 parts of a commercial carrier based on diphenyl and 4 parts of the dye formulation prepared in the above manner as a powder. This exhaustion liquor together with the material to be dyed and contained therein is then heated to 98°-100° C. over a period of 30 minutes and left at the set temperature for a treatment time of 60 minutes.

After the liquor is cooled, the material thus dyed is rinsed with water, then reduction cleared in an aqueous medium at 80° C. with the participation of sodium dithionite/sodium hydroxide and finally dried to give a dark blue dyeing as the result of the dyeing.

After the dyeing procedure is completed, no significant amounts of dye remain a residual content in the exhausted dyebath.

EXAMPLE 2

The procedure for the exhaustion dyeing at the boiling temperature of Example 1 is repeated, except that instead of the 100 parts of 100% pure polyester fiber material mentioned in Example 1 an intimate mixture of 70 parts of this polyester fiber and 30 parts of either
  (a) cotton or
  (b) regenerated cellulose fibers of
  (c) wool
in yarn form are used, to give in this case a navy dyeing on the polyester fiber component of the material which shows only slight staining of the cotton, regenerated cellulose fiber or wool components.

By means of an aftertreatment of the mixed yarn thus dyed at 80° C. for 15 minutes by means of an aqueous liquor containing 3 g/l of sodium dithionite and 5 g/l of sodium hydroxide as reducing agents, the stained cotton or regenerated cellulose fiber portion of the material is completely decolorized. Due to possible damage of the fiber the use of sodium hydroxide must be omitted when the wool portion is cleaned.

EXAMPLE 3

For the exhaustion dyeing of 100 parts of a polyester fiber material consisting of a mixed polymer based on polyethylene terephthalate and small amounts of polybutylene terephthalate in piece form on a known jetdyeing machine, a liquor of the composition 1000 parts of water of 60° C., 2 parts of 40% strength acetic acid, 6 parts of a commercial carrier based on o-phenylphenol, 0.5 part of a commercial yellow dye of the type C.I. Disperse Yellow 54 (C.I. No. 47020), 0.2 part of a commercial red dye of the type C.I. Disperse Red 73 (C.I. No. 11116) and 4 parts of a liquid dye formulation prepared by aqueous milling in a pearl mill of 30 parts of a nonylphenoloxethylate (with 25 mol of converted ethylene oxide), 40 parts of a conventional dispersant from the series of the sulfonated naphthalene/formaldehyde condensation products, 200 parts of water and multicomponent mixture of 12.5 parts of the disperse blue dye of the formula I, 5 parts of the disperse blue dye of the formula II, 2.5 parts of the disperse blue dye of the formula III and 17.5 parts of the disperse blue dye of the formula V was used.

The dyeing procedure is carried out by heating the dyebath to 106° C. over a period of 45 minutes and dyeing the textile material at this temperature for another 45 minutes. The jet-dyeing machine is then cooled to 70° C., and the material thus dyed is rinsed with water during further circulations. After the operation is completed, a navy dyeing having good fastness properties and excellent levelness is obtained.

EXAMPLE 4

The dyeing procedure as described in Example 3 is repeated, except that the blue dye of the formula III is not used, to give a comparable dyeing result.

EXAMPLE 5

The dyeing procedure of Example 1 is repeated, except that the dye of the formula III in the dye formulation in powder form used there is replaced by the corresponding amount of the blue dye of the formula IV, to give a similarly good dyeing result.

EXAMPLE 6

The exhaustion dyeing according to Example 3 is repeated, except that the dye of the formula V is replaced by the corresponding amount of a blue dye of the formula VI, VII or VIII and the additional use of the dye C.I. Disperse Red 73 is omitted, to give also a navy dyeing having good fastness properties.

EXAMPLE 7

The dyeing procedure analogously to Example 1 is repeated, except that in accordance with the data given there a dye dispersion is prepared which consists, with respect to the dye components, of a mixture of 18 parts of the disperse blue dye of the formula I, 10 parts of the disperse blue dye of the formula II, 6 parts of the disperse blue dye of the formula III and 66 parts of the disperse blue dye of the formula V instead of the composition shown in Example 1, to give an exhaust dyeing of polyester fiber piece goods equivalent to that in Example 1.

We claim:

1. A dye formulation in the form of a multi-component mixture or a mixed crystal of blue-type disperse-azo dyestuffs for exhaust-dyeing synthetic fiber material, which comprises:

10 to 40 parts by weight of the dye of the formula I,

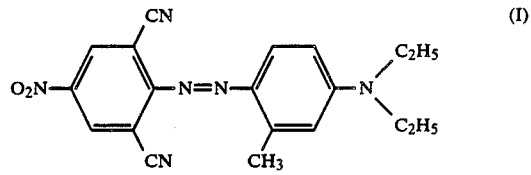

and 5 to 30 parts by weight of the dye of the formula II,

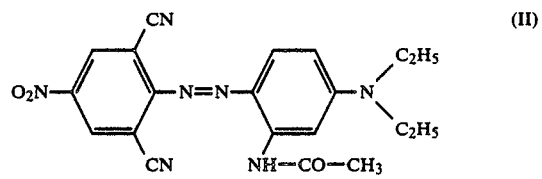

and 0 to 20 parts by weight of at least one dye of the formulae III or IV

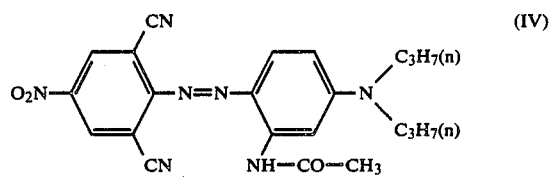

and 20 to 75 parts by weight of at least one dye of the formulae V, VI, VII or VIII

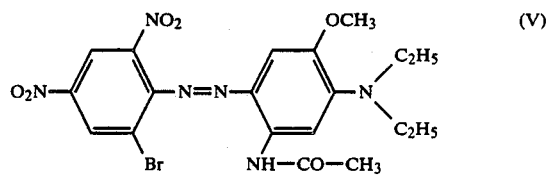

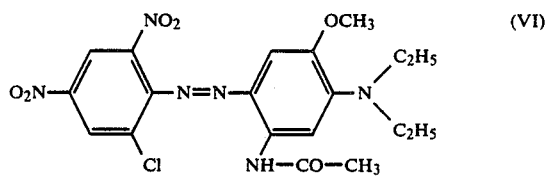

-continued

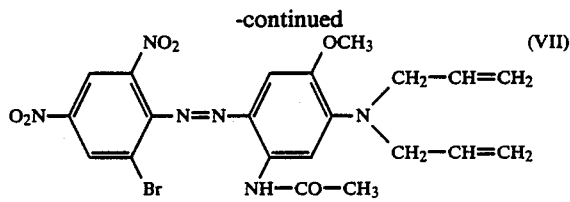

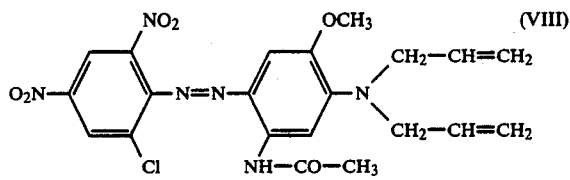

wherein the total amount of the respective individual dyes I to VIII, result in 100 parts by weight of the total dye formulation and are based on the content of pure dyestuff.

2. A dye formulation as claimed in claim 1, which comprises
   15 to 30 parts by weight of the dye of the formula I, and
   10 to 20 parts by weight of the dye of the formula II, and
   3 to 15 parts by weight of at least one dye of the formulae III or IV, and
   35 to 70 parts by weight of at least one dye of the formulae V, VI, VII or VIII, wherein the total amount of the respective individual dyes I to VIII, result in 100 parts by weight of the total dye formulation and are based on the content of pure dyestuff.

3. A dye formulation as claimed in claim 1, comprising a mixture or a mixed crystal of the dyes of the formulae I, II and III, and one of the dyes of the formulae V, VI, VII or VIII.

4. A dye formulation as claimed in claim 1, comprising a mixture or a mixed crystal of the dyes of the formulae I, II and IV, and one of the dyes of the formulae V, VI, VII, or VIII.

5. A dye formulation as claimed in claim 1, further comprising a disperse dye of a chemical structure different from that of the dyes according to formulae I to VIII, which likewise produces a blue shade, or a shade other than blue, by itself, wherein the total amount of the respective individual dyes of the formulae I to VIII, along with said disperse dye not of the formulae I to VIII results in 100 parts by weight of the total dye formulation and are based on the content of the pure dyestuff.

6. A dye formulation as claimed in claim 1, wherein the mixture or the mixed crystal of the disperse dyes having the formulae I to VIII, is in a state of fine dispersion resulting from grinding by means of dispersant(s).

7. A dye formulation as claimed in claim 5, wherein the mixture or the mixed crystal of the disperse dyes having the formulae I to VIII, is in a state of fine dispersion resulting from grinding by means of dispersant(s).

8. A dye formulation as claimed in claim 6, comprising the disperse dyes of the formulae I to VIII, which is obtained by
   mixing ready-finished dye formulations of the respective individual dyes, or
   conjoint finishing of the respective individual dyes in the form of a mixtures, or
   conjoint finishing of the respective individual dyes in form of a mixture, under conditions where the formulation of a mixed crystal from the individual components occurs; or
   finishing a mixed crystal of the respective individual dyes originated from common azo coupling or common cyano exchange.

9. A dye formulation as claimed in claim 7, comprising the disperse dyes of the formulae I to VIII, which is obtained by
   mixing ready-finished dye formulations of the respective individual dyes, or
   conjoint finishing of the respective individual dyes in the form of a mixtures, or
   conjoint finishing of the respective individual dyes in form of a mixture, under conditions where the formulation of a mixed crystal from the individual components occurs; or
   finishing a mixed crystal of the respective individual dyes originated from common azo coupling or common cyano exchange.

10. A method of making blue self-shade hues or combination-shade hues on textile material of synthetic fibers or containing synthetic fibers in an exhaustion dyeing process comprising the step of dyeing said material with the dye formulation of claim 1.

11. A method of making non-blue hues on textile material of synthetic fibers or containing synthetic fibers in an exhaustion dyeing process comprising the step of dyeing said material with the dye formulation of claim 5.

12. A process for exhaust-dyeing textile material of synthetic fibers or containing these synthetic fibers as component of a fiber blend with natural fibers or regenerated fibers, wherein the disperse blue-type dye used for the self-shade or combination-shade dyeing in the dye formulation of claim 1.

13. The process as claimed in claim 12, wherein the synthetic fiber material is composed of polyester fibers or secondary cellulose acetate fibers or cellulose triacetate fibers.

14. The process as claimed in claim 13, wherein the polyester fiber material is a copolymer of an ester monomer modified with a polyethylene glycol, isophthalic acid or a polymerizable phosphorus compound as an incorporated component.

15. The process as claimed in claim 12, wherein the fiber blends which contain synthetic fibers are composed of polyester fiber materials and wool and/or cellulose fibers.

16. The process as claimed in claim 12, wherein the dyeing operation by the exhaustion technique is carried out under high-temperature (HT) conditions.

17. The process as claimed in claim 12, wherein the dyeing operation by the exhaustion technique is carried out under atmospheric conditions at the boiling temperature of the aqueous dyeing medium in the absence or presence of a carrier.

18. The process as claimed in claim 12, wherein a dye formulation in the form of a multi-component mixture or a mixed crystal of blue-type disperse-azo dyestuffs for exhaust-dyeing synthetic fiber material, which comprises:
   10 to 40 parts by weight of the dye of the formula I,

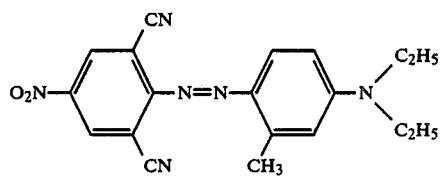

(I)

and 5 to 30 parts by weight of the dye of the formula II,

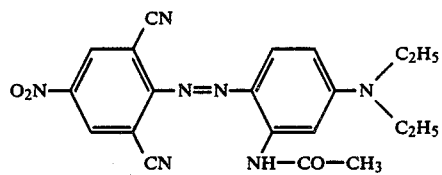

(II)

and 0 to 20 parts by weight of at least one dye of the formulae III or IV

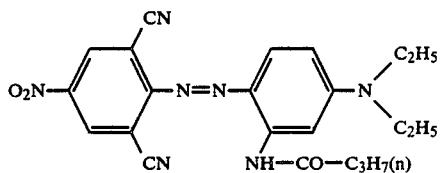

(III)

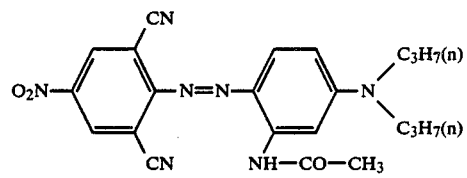

(IV)

and 20 to 75 parts by weight of at least one dye of the formulae V, VI, VII or VIII

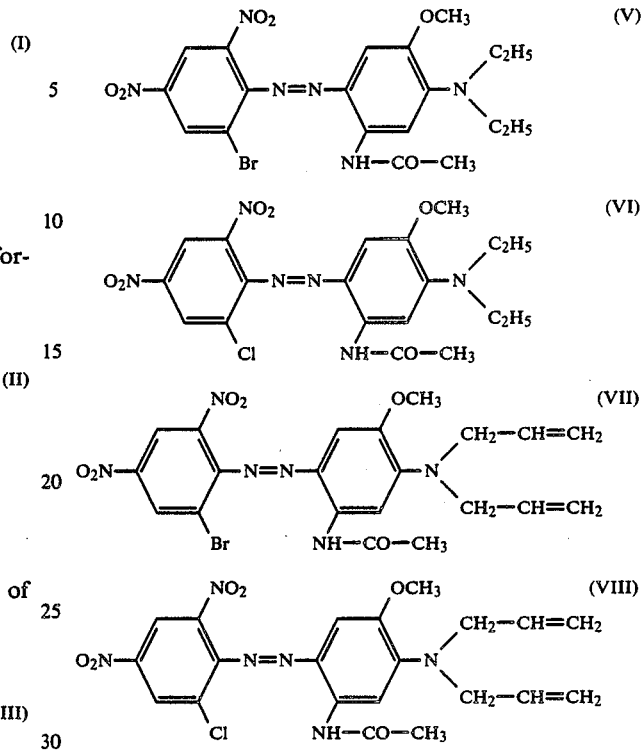

and a disperse dye of a chemical structure different from that of the dyes according to formulae I to VIII, which likewise produces a blue shade, or a shade other than blue, by itself, wherein the total amount of the respective individual dyes of the formulae I to VIII, along with said disperse dye not of the formulae I to VIII results in 100 parts by weight of the total dye formulation and are based on the content of the pure dyestuff is used for the dyeing operation.

19. A textile material of synthetic fibers or containing these synthetic fibers which has been dyed by means of a dye formulation as claimed in claim 1.

20. A textile material of synthetic fibers or containing these synthetic fibers, which has been dyed by a process as claimed in claim 12.

* * * * *

UNITED STATES PATENT AND TRADEMARK OFFICE
CERTIFICATE OF CORRECTION

PATENT NO. : 4,985,044
DATED : 1/15/91
INVENTOR(S) : MANFRED HAHNKE, ET AL.

It is certified that error appears in the above-identified patent and that said Letters Patent is hereby corrected as shown below:

At Column 2, Line 27, "3,126,788" should read -- 3,216,788 -- .

At Column 4, Line 34, insert -- be -- between "can" and "carried" .

At Column 6, Line 47, "a" should read -- as -- .

At Column 6, Line 57, "of" should read -- or -- .

In Claim 8, Column 9, Line 68, "mixtures" should read -- mixture -- .

In Claim 8, Column 10, Line 3, "formulation" should read -- formation -- .

In Claim 9, Column 10, Line 15, "mixtures" should read -- mixture -- .

UNITED STATES PATENT AND TRADEMARK OFFICE
CERTIFICATE OF CORRECTION

PATENT NO. : 4,985,044

DATED : January 15, 1991

INVENTOR(S) : MANFRED HAHNKE, et al

It is certified that error appears in the above-identified patent and that said Letters Patent is hereby corrected as shown below:

In Claim 9, Column 10, Line 18, "formulation" should read
--formation--.

Signed and Sealed this

Fourteenth Day of July, 1992

Attest:

DOUGLAS B. COMER

*Attesting Officer*  *Acting Commissioner of Patents and Trademarks*